(12) United States Patent
Hyun

(10) Patent No.: US 12,439,902 B2
(45) Date of Patent: Oct. 14, 2025

(54) FISHING REEL HAVING METAL FRONT COVER

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 222 days.

(21) Appl. No.: 18/316,220

(22) Filed: May 11, 2023

(65) Prior Publication Data

US 2023/0371486 A1 Nov. 23, 2023

(30) Foreign Application Priority Data

May 17, 2022 (KR) .......................... 10-2022-0060281

(51) Int. Cl.
*A01K 89/01* (2006.01)
*A01K 89/015* (2006.01)

(52) U.S. Cl.
CPC ................................ *A01K 89/0192* (2015.05)

(58) Field of Classification Search
CPC .......... A01K 89/0192; A01K 89/01921; A01K 89/01931; A01K 89/0102
See application file for complete search history.

(56) References Cited

U.S. PATENT DOCUMENTS

| | | | | |
|---|---|---|---|---|
| 3,836,092 A | * | 9/1974 | Hull | A01K 89/0102 242/321 |
| 5,149,010 A | * | 9/1992 | Bacher | A01K 89/0102 242/312 |
| 5,921,488 A | * | 7/1999 | DeGrenier | A01K 89/0102 242/239 |
| 6,889,926 B1 | * | 5/2005 | Li | A01K 89/0102 242/310 |

FOREIGN PATENT DOCUMENTS

| | | | | |
|---|---|---|---|---|
| CA | 2652191 A1 | * | 8/2009 | .......... A01K 89/015 |
| CN | 110313453 A | * | 10/2019 | .......... A01K 89/015 |
| EP | 2204091 B1 | * | 8/2012 | .......... A01K 89/015 |
| JP | H11113461 A | * | 4/1999 | ........ A01K 89/0192 |
| JP | 2014166151 A | | 9/2014 | |
| JP | 2019076090 A | | 5/2019 | |

(Continued)

*Primary Examiner* — Emmanuel M Marcelo
(74) *Attorney, Agent, or Firm* — CANTOR COLBURN LLP

(57) ABSTRACT

Provided is a fishing reel having a front cover protecting a level wind, wherein the front cover is separately formed of a high strength lightweight metal material such as aluminum to protect the level wind more safe and the front cover is easily assembled with various designs to improve the exterior design, and the front cover allows a user to decorate and use the fishing reel on the basis of the user's preference. The fishing reel including the metal front cover includes a frame including side walls on opposite sides thereof and forming a spool mounting part and a level wind mounting part, and the front cover coupled to both front ends of the side walls (Continued)

on the opposite sides to protect a level wind, and made of a metal material and including a coupling part bent toward the frame and coupled to each of the side walls.

2 Claims, 8 Drawing Sheets

(56) References Cited

FOREIGN PATENT DOCUMENTS

| KR | 19980032374 | | 7/1998 | |
|----|-------------|---|--------|---|
| KR | 20020042415 A | * | 6/2002 | ......... A01K 89/0192 |
| KR | 20140064604 A | * | 5/2014 | ......... A01K 89/0192 |
| KR | 20140064606 A | * | 5/2014 | ......... A01K 89/0192 |
| KR | 20140086829 | | 7/2014 | |

* cited by examiner ical Field

The present disclosure relates to a fishing reel having a metal front cover. More particularly, the present disclosure relates to a fishing reel capable of improving durability and various design applications while forming a metal front cover coupled to a front surface of a frame to protect a level winder.

2. Description of the Related Art

In general, a fishing reel, specifically, a bait casting reel, includes a frame to which a spool is mounted, a gear side cover mounted to a first surface of the frame, a palm side cover mounted to a second surface of the frame, and a handle provided at the gear side cover, but there is fine difference in an operation structure of a brake dial or a tension nut according to a braking method of the spool, and the left and right side covers form the exterior appearance of the opposite surfaces of the fishing reel.

The fishing reel includes a guide hole on a front end of the frame to guide a fishing line wound around the spool into a top portion of a fishing rod. The guide hole is provided as a level wind to allow the fishing line to be uniformly reeled out around left and right portions of the entire spool so that the fishing line can be easily reeled off without tangle during casting to increase a casting distance.

In addition, the level wind is coupled to a worm shaft transversely coupled to a front end of the frame and rotated, and When the fishing line of the spool is reeled out or in, as a spool shaft and the worm shaft are rotated in conjunction with each other, the level wind is reciprocated leftward and rightward along a bidirectional rail part of the worm shaft.

In the fishing reel, the front cover forming front exterior of the fishing reel is coupled to the front side of the level winder, i.e., a front end of the frame to protect the level wind at the rear side of the front cover from the external force.

The front cover for the conventional fishing reel is formed of a plastic injection molding, and as the thickness of the front cover decreases due to light, thin, short, small and compact design of the fishing reel, the strength of the front cover decreases, and as a result, protection for the level wind weakens. Furthermore, due to the limitations of a printing method and quality of the plastic injection molding, color and other exterior designs of the fishing reel may be uniform, which are disadvantages.

For reference, as the related art of the front cover of the fishing reel, Korean Patent Application Publication No. 10-2014-0086829, Korean Patent Application Publication No. 10-1998-032374, etc.

SUMMARY

Accordingly, the present disclosure has been made keeping in mind the above problems occurring in the related art, and the present disclosure is intended to propose a fishing reel with a front cover protecting a level wind, wherein the front cover is separately formed of a metal material, specifically, of a high strength lightweight metal material such as aluminum to protect the level wind more safe and the front cover is easily assembled with various designs such as various colors to improve the exterior design, and the front cover is configured to allow a user to decorate and use the fishing reel on the basis of the user's preference.

In order to achieve the above objective, according to the present disclosure, there is a fishing reel including a metal front cover, the fishing reel including:

a frame including side walls on opposite sides thereof and forming a spool mounting part and a level wind mounting part; and the front cover coupled to both front ends of the side walls on the opposite sides to protect a level wind, and made of a metal material and including a coupling part bent toward the frame and coupled to each of the side walls.

In the fishing reel according to the present disclosure, wherein each of the side walls may include an assembling part, and the front cover may include a front part bent to allow the coupling part to be in surface-contact with the assembling part, and legs coupled thereto to extend in a longitudinal direction of the coupling part and supported by a support end of each of the side walls.

Furthermore, in the fishing reel according to the present disclosure, wherein the assembling part has a fastening hole to which a bolt is fastened, and the coupling part has a coupling hole into which the bolt is inserted.

Furthermore, in the fishing reel according to the present disclosure, each of the legs may be removably coupled to the coupling part.

According to the present disclosure, the fishing reel is improved in the strength with the metal front cover to protect the level wind safely, and simultaneously, the front cover is decorated by metal printing with high quality so that the user can use the fishing reel with various designs while tuning the fishing reel, and the front cover consisting of the front part and the legs allows a support force of the frame to be enhanced to maintain more stable coupling state, and the detachable front part and legs allow the front cover to be easily processed and produced with various designs, and the front cover of the present disclosure can be interchanged with respect to the frame using the conventional plastic front cover and be used universally, and the parts of the front cover are assembled stably with mutual engaged structure through one bolt, so that the durability of the fishing reel can be improved.

DETAILED DESCRIPTION

Figure 1:
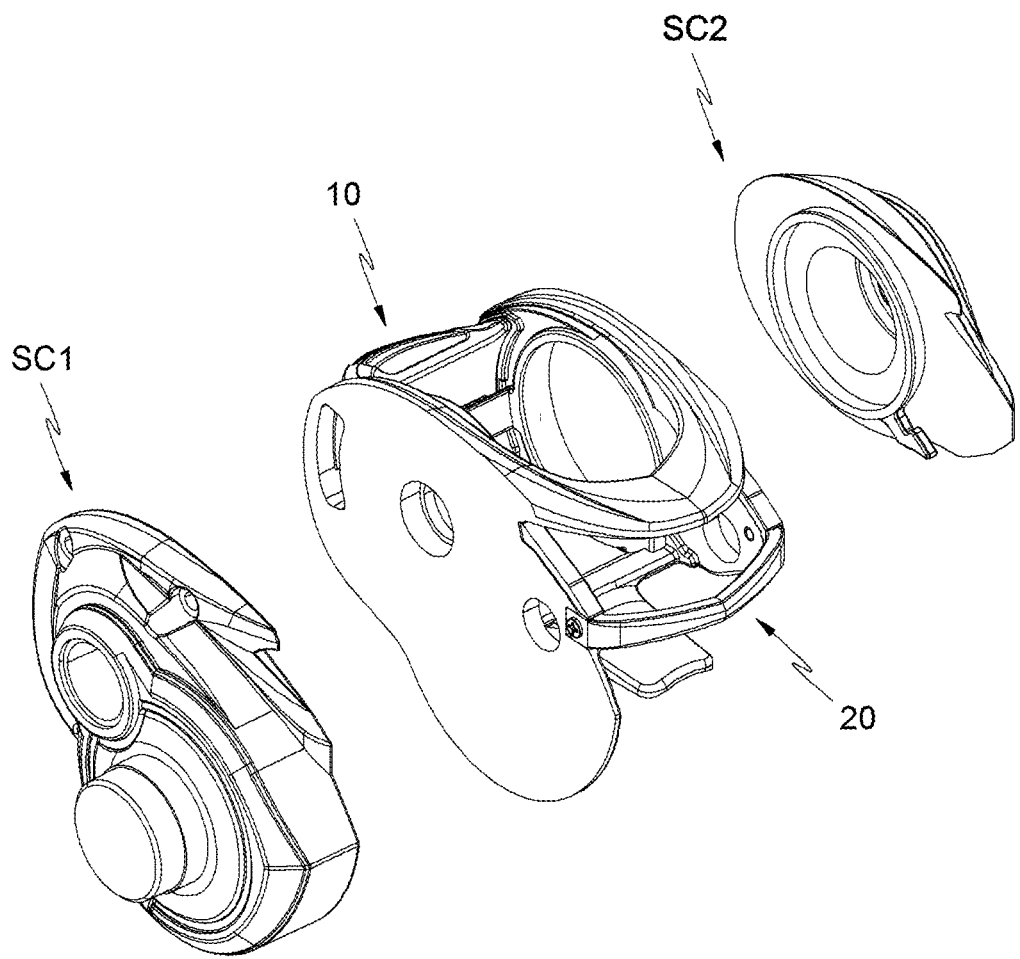
FIGS. 1 and 2 are perspective views showing a first embodiment of the present disclosure.
Figure 2:
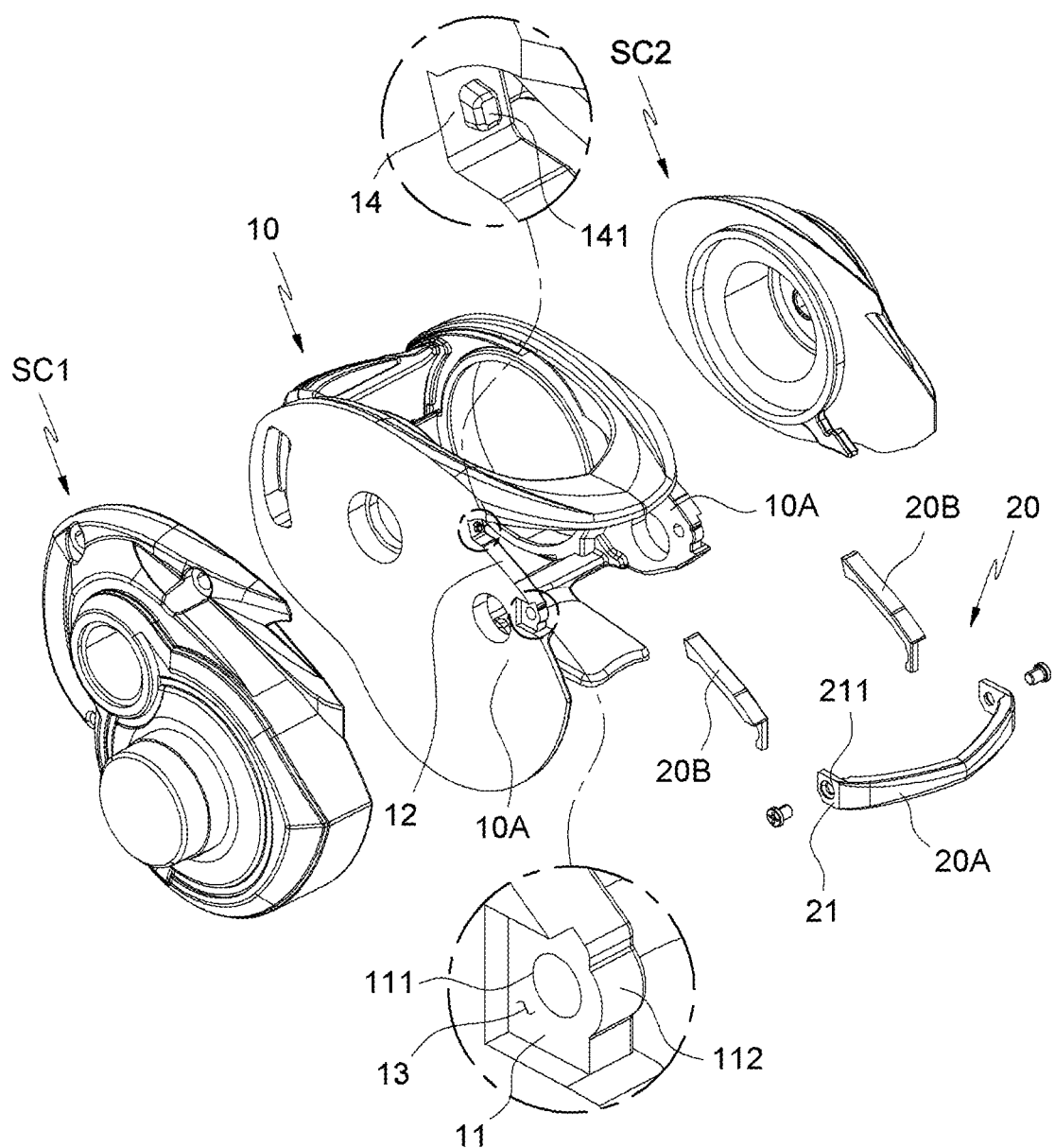
Figure 3:
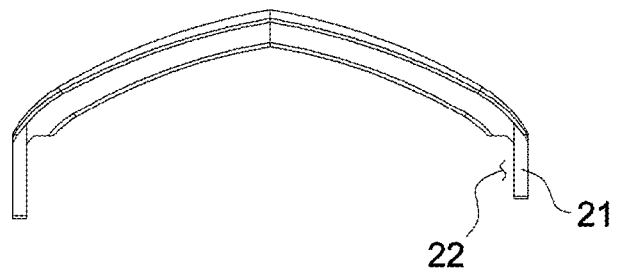
FIGS. 3 and 4 are main part views showing a separable front cover according to the present disclosure.
Figure 4:
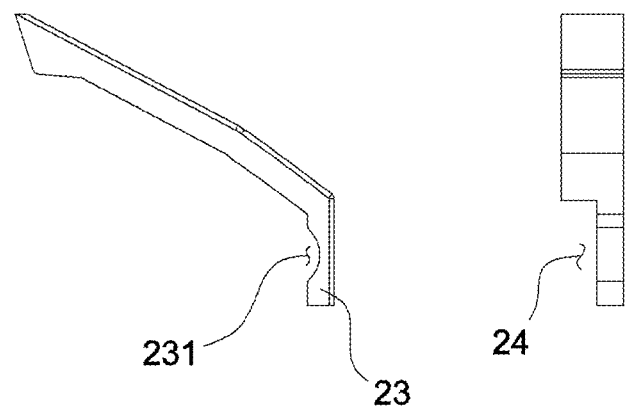

For convenience of the description of a fishing reel according to the present disclosure, when an approximate direction rather than a precise direction is specified with reference to FIG. 1, a lower side is determined based on a direction to which gravity is applied, and upward and downward directions and rightward and leftward directions are determined based on the lower side. This standard may be also applied to the other drawings, and directions may be specified and described based on this standard unless the detailed description of the present disclosure and the claims specially indicate otherwise.

Hereinbelow, a fishing reel according to the present disclosure will be described with reference to accompanying drawings.

The present disclosure relates to the fishing reel having a front cover formed of a metal material as shown in FIGS. 1 to 6.

Mostly, the fishing reel includes the frame 10, a spool (not shown) which is shaft-installed at the frame 10 and on which a fishing line is spooled, a first side cover SC1 at a gear side and a second side cover SC2 at a palm side, the first and second side covers being respectively coupled to the opposite surfaces of the frame 10, and a front cover 20, 20' coupled to a front end of the frame 10.

As not shown in the drawings, a remaining basic composition of the fishing reel is already known, and description thereof will be omitted for convenience of understanding.

Specifically, the present disclosure includes:
the frame 10 including side walls 10A at opposite sides thereof and forming a spool mounting part and a level wind mounting part; and
the front cover 20, 20' coupled to both front ends of the opposite side walls 10A to protect a level wind (not shown) at a rear side, and made of a metal material and including a coupling part 21 bent toward the frame and coupled to each of the side walls.

The frame 10 is configured such that the first side cover SC1 and the second side cover SC2 are respectively coupled to outer surfaces of the opposite side walls 10A in a bolting manner, and a worm shaft is shaft-installed in the level wind mounting part and the level wind is coupled thereto to allow a transverse reciprocating motion of the level wind.

The frame 10 includes an assembling part 11 at the front side of the level wind mounting part for coupling of the front cover 20, 20'.

The assembling part 11 includes a fastening hole 111 which is formed on a front end of each of the side walls 10A on the opposite sides by penetrating both surfaces thereof. A bolt for coupling of the front cover 20, 20' is fastened into the fastening hole 111 in a screwing manner.

A support end 12 is formed on an upper end of the assembling part 11 and the support end 12 is connected to the assembling part 11 to be inclined upward toward the rear side along an edge surface of each of the opposite side walls 10A, and a leg 20B of the front cover 20, 20' is coupled to the support end 12 while being supported thereto.

In addition, each of the side walls 10A includes an insertion groove 13 formed on an outside surface of the assembling part 11. The insertion groove 13 is formed in a shape in which a part of the outside surface of each of the side walls 10A where the assembling part 11 is formed is processed in a volume reduction manner.

Furthermore, a supporting part 14 bent in an upward vertical direction is connected to a rear end of the support end 12, and an assembly protrusion 141 is provided by protruding forward on the supporting part 14.

The front cover 20, 20' is separately processed of a metal material, specifically, of a high strength lightweight metal material such as aluminum.

Mostly, the front cover 20, 20' consists of a front part 20A and legs 20B on the opposite sides.

Specifically, the front cover 20, 20' includes the front part 20A which is bent such that the coupling part 21 is in surface-contact with the assembling part 11, and the legs 20B, wherein each leg 20B is coupled to the coupling part 21 to extend in a longitudinal direction of the coupling part 21 and is supported by the support end 12 of each of the opposite side walls 10A.

The coupling part 21 is formed by bent from one end or opposite ends of the front part 20A to protrude toward the frame 10. At this point, for coupling stability, it is preferable that the coupling part 21 is bent rearward from each of the opposite ends of the front part 20A to be connected to the front part 20A.

Furthermore, the coupling part 21 is formed such that a coupling hole 211 corresponding to the fastening hole 111 is formed by penetrating the opposite surfaces of the coupling part 21, and the bolt is inserted into the coupling hole 211 to be screw-fastened to the fastening hole 111.

As the first embodiment shown in FIGS. 1 to 4, the front cover 20, 20' may be configured as a separate type front cover 20 in which the front part 20A and the opposite legs 20B are separately processed into a 3-pieces structure having different parts and the front part 20A and the pair of legs 20B are detachable from each other.

Figure 5:
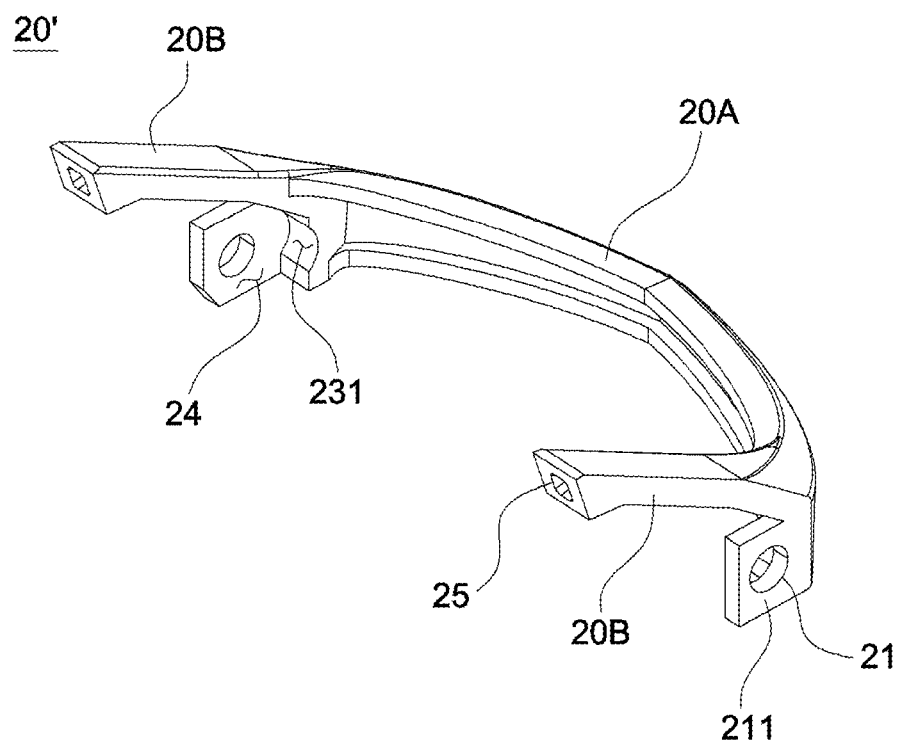
FIG. 5 is a perspective view showing an integrated front cover according to the present disclosure.

Otherwise, as a second embodiment shown in FIG. 5, the front cover 20, 20' may be configured as an integral type front cover 20' in which the front part 20A and the opposite legs 20B are processed to be integrated into a single part.

This configuration is to allow following cases, according to a fishing reel, when a level of processing difficulty of an existing plastic front cover design is high (i.e., when metal processing is difficult or expensive), the separate type front cover 20 according to the first embodiment is used interchangeably.

When a level of processing difficulty of the existing plastic front cover design is low, the integral type front cover 20' according to the second embodiment is used interchangeably.

The metal front cover 20, 20' has a different texture from the plastic front cover, and the aesthetic in design thereof may be improved through simpler and unique design printing, and since the strength of the metal front cover is stronger than the plastic front cover, the original function thereof that is protection for the level wind can be secured.

More specifically, the front part 20A includes a coupling groove 22 formed on an inside surface of the coupling part 21.

Each of the legs 20B includes a fixing piece 23 which is supported by a front end of the assembling part 11 and inserted into and coupled to the coupling groove 22.

The coupling groove 22 is formed in a shape in which the inside surface of the coupling part 21 is processed in the volume reduction manner.

The fixing piece 23 is bent from the front end of each of the legs 20B in a downward vertical direction and includes an insertion groove 231 on a rear surface thereof, and a convex portion 112 protruding from a front surface of the assembling part 11 is inserted into the insertion groove 231.

The convex portion 112 prevents the assembling part 11 from losing the volume thereof by the fastening hole 111 to improve the own strength of the assembling part 11, and allows the fixing piece 23 to be fixed while being in close contact with the support end 12.

Furthermore, each of the legs 20B includes a fixing groove 24 formed on an outside surface of the fixing piece 23.

The fixing groove 24 is formed in a shape in which the outside surface of the fixing piece 23 is processed in the volume reduction manner.

The fixing groove 24 has a shape extending to corresponding to the insertion groove 13, and the coupling part 21 is inserted into the fixing groove 24.

In addition, each of the legs 20B includes an assembly groove 25 into which the assembly protrusion 141 is inserted.

The assembly groove 25 is provided on a rear end surface of each of the legs 20B, the surface being in close contact with the supporting part 14 to correspond to the assembly protrusion 141.

According to the first embodiment of the present disclosure, when each of the legs 20B is assembled to the support end 12 in order to insert the assembly protrusion 141 into the assembly groove 25, each of the legs 20B is assembled and coupled to the support end 12 temporarily as the convex portion 112 is inserted into the insertion groove 231, and After then, when the coupling part 21 is inserted into the fixing groove 24 and the insertion groove 13 to be engaged therewith, the fixing piece 23 is inserted to the coupling groove 22, i.e., between a front surface of the assembling part 11 and a rear surface of the front part 20A, to allow temporary coupling therebetween.

In this state, the bolt is inserted into the coupling hole 211 to be screw-fastened to the fastening hole 111, so that the legs 20B is compressed while being brought into close contact with the side walls 10A by the front part 20A, thereby completing assembly of the separate type front cover 20.

Furthermore, in the second embodiment, when the integral type front cover 20' is assembled to the opposite side walls 10A in order to insert the assembly protrusion 141 into the assembly groove 25, the front cover 20' is assembled and coupled to the side walls 10A temporarily as the convex portion 112 is inserted into the insertion groove 231.

In this state, when the bolt is inserted into the coupling hole 211 to be screw-fastened to the fastening hole 111, assembly of the integral type front cover 20' is completed.

As such, instead of the plastic front cover of the fishing reel which is conventionally used, the present disclosure is configured to use the metal front cover 20, 20' with improved strength and design interchangeably to enable a user to use the fishing reel while tuning the fishing reel on the basis of the user's preference.

Figure 6:
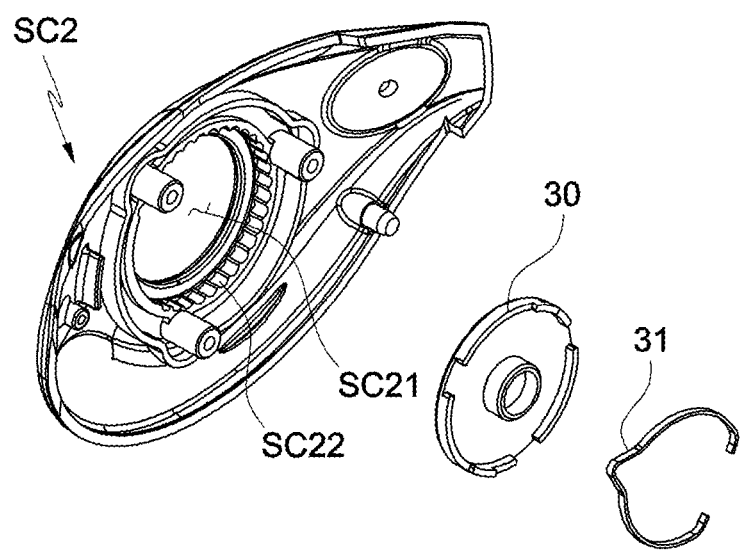
FIG. 6 is a main part view of the present disclosure.

Meanwhile, as shown in FIG. 6, the present disclosure includes a control dial 30 inserted in a shaft hole SC21 of the second side cover SC2 to control a brake means such as a magnet brake, etc.

The control dial 30 is configured to allow rotation control thereof while being inserted in the shaft hole SC21 of the second side cover SC2. The control dial 30 includes an elastic pin 31 caught to a saw-toothed part SC22 formed on an inside surface of the shaft hole SC21, and when the control dial 30 is rotated to be stopped, a click sound having a predetermined volume is generated.

Furthermore, the present disclosure adopts a click sound generation means of ball spring type in place of the elastic pin 31 to improve the fixation force and the rotation stability of the control dial 30.

Figure 7A:
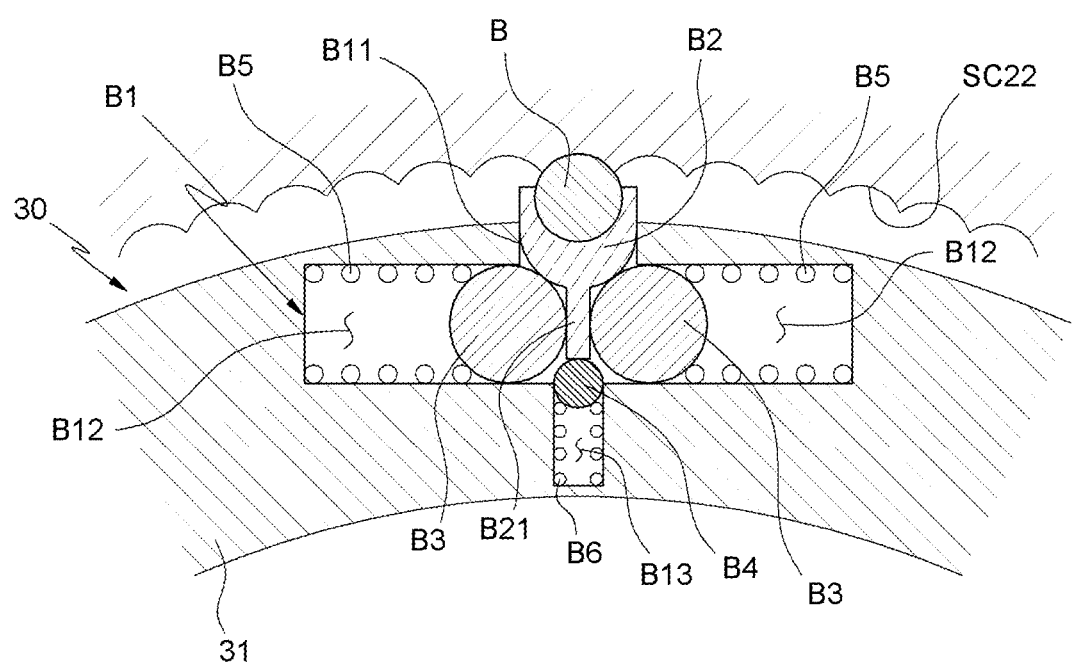
FIGS. 7A and 7B are main-part sectional views showing a click-sound generation means of a ball spring type according to the present disclosure.
Figure 7B:
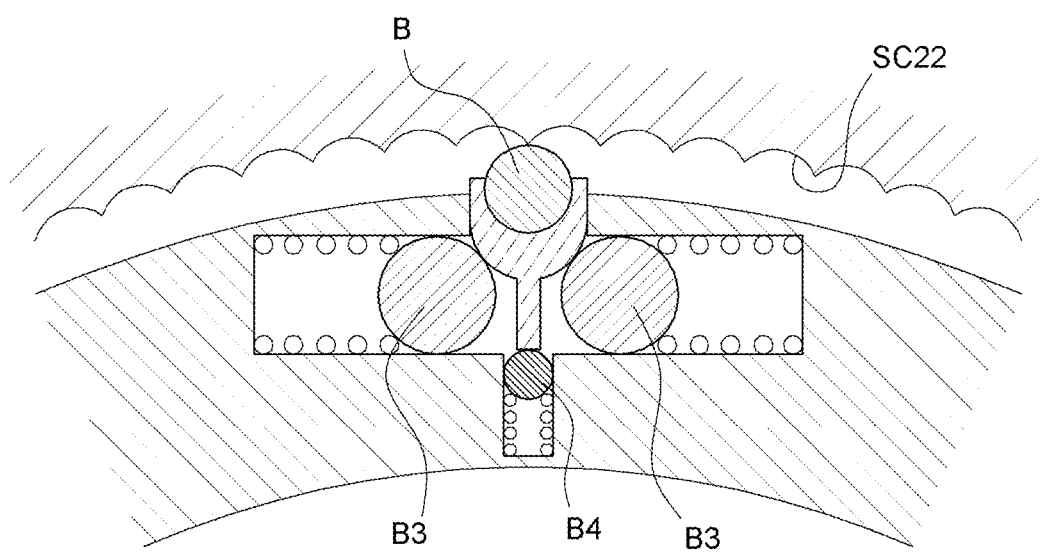

As shown in FIGS. 7A and 7B, the click sound generation means is provided on a protrusion 31 protruding along an edge of a second surface of the control dial 30, and includes:

a forward and rearward movement groove B1 including an outlet hole B11 formed by penetrating a diametrical outside surface of the protrusion 31, a guide hole B12 formed in a direction orthogonal to the outlet hole B11 inside the protrusion 31, and an insertion groove B13 formed in a diametrical inside surface of the protrusion 31, a pressure rod B2 exposed while being inserted in the outlet hole B11, wherein a ball member B is coupled to an outer front end thereof to be insertable into a groove of the saw-toothed part SC22 and a push protrusion B21 extends rearward on an inside portion thereof, a pair of first support balls B3 inserted into and coupled to the guide hole B12 to be moved forward and rearward in left and right of the pressure rod B2, and brought in contact with a rear surface of the pressure rod B2, a second support ball B4 inserted into and coupled to the insertion groove B13 to be moved forward and rearward and brought into contact with the push protrusion B21, and a compression spring B5, B6 provided at each of the guide hole B12 and the insertion groove B13 to elastically support the pair of first support balls B3 and the second support ball B4 inward.

The pressure rod B2 has a seating groove on a front surface thereof to allow the ball member B to be inserted free-rotatably and has a hemispherical rear surface, and the push protrusion B21 is connected to a center portion of the rear surface of the pressure rod B2 in a shape protruding long by a predetermined length.

The pressure rod B2 is inserted into the outlet hole B11, and a catching protrusion not shown in the drawing allows the pressure rod B2 to be coupled to the outlet hole B11 without being separated therefrom.

Furthermore, the first support balls B3 and the second support ball B4 are elastically supported by the compression spring B5, B6 so as to be moved forward, respectively.

Therefore, with elastic operation of the compression spring B5, B6, the first support balls B3 and the second support ball B4 are moved to push forward to eject the pressure rod B2, and the ball member B is inserted into one of grooves of the saw-toothed part SC22 to be caught.

In this state, when the control dial 30 is rotated, as the ball member B is pushed rearward by a protrusion of the saw-toothed part SC22, the first support balls B3 are moved leftward, respectively, and first springs B5 are compressed.

At the same time, as the push protrusion B21 of the pressure rod B2 pushes the second support ball B4 rearward, a second spring B6 is compressed.

At this state, when the ball member B enters another groove of the saw-toothed part SC22, elastic forces of the first and second compression springs B5 and B6 act simultaneously to push the pressure rod B2, so that the ball member B is inserted into the groove of the saw-toothed part SC22.

The ball spring type click sound generation means is configured to allow triplex elastic support with the 2 kinds of compression springs B5 and B6 to pressurize the ball member B with sufficient pressure instead of a high tension spring. Compared to the general ball spring, as a forward and rearward stroke of the ball member B is reduced, even when a high tension long spring is not used, a mounting space can be minimized with a compact design to achieve miniaturization of the part in order to prevent deterioration in coupling between dial cams, sufficient fixation force can be secured, and large click sound can be generated.

Hereinabove, in describing the present disclosure, although the fishing reel has been mainly described with reference to accompanying drawings, those skilled in the art will appreciate that various modifications, additions and substitutions are possible, without departing from the scope and spirit of the present disclosure as disclosed in the accompanying claims.

The invention claimed is:

1. A fishing reel comprising a metal front cover, the fishing reel comprising:
    a frame comprising: a side wall on opposite sides thereof and forming a spool mounting part and a level wind mounting part, the side wall comprising: a support end formed along an edge surface of the side wall;
    an assembling part formed at a lower end of the support end;
    a supporting part formed at an upper end of the support end, the supporting part comprising: an assembling protrusion protruding forward from the supporting part;
    a front cover made of a metal material and coupled to a front end of the side wall on the opposite sides of the frame to protect a level wind, the front cover comprising: a front part bent toward the frame and a coupling part formed at both ends of the front part, wherein the coupling part is detachably attached to the assembling part; and
    a leg detachably attached to the front cover, a first end of the leg being detachably attached to the coupling part and a second end of the leg being detachably attached to the supporting part, wherein the assembling protrusion is inserted into an assembly groove formed on a front surface of the second end of the leg in such a manner that the leg is in a surface-contact with the support end.

2. The fishing reel of claim 1, wherein the assembling part has a fastening hole to which a bolt is fastened, and
    the coupling part has a coupling hole into which the bolt is inserted.

* * * * *